United States Patent
Ishiguro et al.

(10) Patent No.: US 6,859,647 B2
(45) Date of Patent: Feb. 22, 2005

(54) INTERFERENCE ELIMINATION SYSTEM AND INTERFERENCE ELIMINATING METHOD

(75) Inventors: Takayuki Ishiguro, Yokosuka (JP); Osamu Nakamura, Yokosuka (JP); Shinji Uebayashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 447 days.

(21) Appl. No.: 10/152,566

(22) Filed: May 23, 2002

(65) Prior Publication Data

US 2002/0177426 A1 Nov. 28, 2002

(30) Foreign Application Priority Data

May 25, 2001 (JP) .................................... P2001-157165

(51) Int. Cl.[7] .......................... H04B 1/10; H04B 15/00
(52) U.S. Cl. .................. 455/296; 455/63.1; 455/501; 455/561
(58) Field of Search ................ 455/63.1, 65, 67.13, 455/296, 308, 424, 501, 504, 506, 517, 524, 561

(56) References Cited

U.S. PATENT DOCUMENTS

| 5,768,254 | A | * | 6/1998 | Papadopoulos et al. ...... 370/201 |
| 6,167,240 | A | * | 12/2000 | Carlsson et al. ......... 455/67.13 |
| 6,353,729 | B1 | * | 3/2002 | Bassirat ..................... 455/11.1 |
| 6,526,271 | B1 | * | 2/2003 | Uesugi et al. .............. 455/296 |
| 6,615,030 | B1 | * | 9/2003 | Saito et al. ................. 455/296 |

* cited by examiner

*Primary Examiner*—Simon Nguyen
(74) *Attorney, Agent, or Firm*—Oblon, Spivak, McClelland, Maier & Neustadt, P.C.

(57) ABSTRACT

A simplified interference elimination system is provided for eliminating from a first radio signal transmitted from a first radio terminal to a first radio base station, the effect of interference due to a second radio signal transmitted from a second radio terminal to a second radio base station. The second radio base station has an extractor for extracting the second radio signal from radio signals received in the second radio base station, and a transmitter for transmitting the extracted second radio signal to the first radio base station. The first radio base station has an interference eliminator for eliminating the second radio signal transmitted from the second radio base station from radio signals received in the first radio base station.

8 Claims, 6 Drawing Sheets

INTERFERENCE ELIMINATION SYSTEM AND INTERFERENCE ELIMINATING METHOD

CROSS REFERENCE TO RELATED APPLICATION

This application is based upon and claims the benefit of priority from the prior Japanese Patent Application No. P2001-157165, filed on May 25, 2001; the entire contents of which are incorporated herein by reference.

BACKGROUND OF THE INVENTION

1. Field of the Invention

This invention relates to an interference elimination system and an interference eliminating method in which a radio base station of a radio communication system eliminates interference from another radio communication system.

2. Description of the Related Art

It is known that a radio base station of a radio communication system and a radio base station of a different radio communication system are often located in the same place or adjoining places for effective land utilization. In this situation, the first radio base station receives a radio signal from a radio terminal it manages and also a radio signal from an interfering radio terminal as a radio terminal of the second radio communication system. Those radio communication systems use different frequencies, so that the first radio base station normally receives a small effect of interference (noise) due to the radio signal from the second radio communication system, that is, the interfering radio terminal.

However, when there are a number of interfering terminals of the second radio communication system and the distance between the first radio terminal and its base station is great, the effect of interference (noise) due to radio signals from the interfering radio terminals to a radio signal from the first radio terminal reaches a significant level, resulting in deterioration in quality of radio communications.

Structure of Conventional Interference Elimination System

FIG. 1 shows a known interference elimination system which solves the above problem. This interference elimination system comprise an interfering radio terminal 10, a radio terminal 11, an interfering radio base station 20 and a radio base station 21.

The radio terminal 11 is a radio communication device connected to the radio base station 21 via a radio channel. The interfering radio terminal 10 is a radio communication device connected to the interfering radio base station 20 via a radio channel.

The radio base station 21 is connected to a network 81 to manage communications of the radio terminal 11. Specifically, the radio base station 21 has a radio 31, a modem 41, a controller 51, an interference regenerator 61 and an interference eliminator 71.

The radio 31 is connected to the modem 41, controller 51, interference regenerator 61 and interference eliminator 71. The radio 31 transmits a signal $S_0$ from the modem 41 to the radio terminal 11 via a radio channel, and transmits radio signals $(S_0+S_1)$ transmitted from the radio terminal 11 and the interfering radio terminal 10 via radio channels to the interference regenerator 61 and the interference eliminator 71.

The interference regenerator 61 is connected to the radio 31, controller 51 and interference eliminator 71. The interference regenerator 61 demodulates the signals $(S_0+S_1)$ from the radio 31 in the same manner as in the interfering radio base station 20 to regenerate the radio signal $S_1$ transmitted from the interfering radio terminal 20, and transmits the regenerated signal $S_1$ to the interference eliminator 71.

The interference eliminator 71 is connected to the radio 31, modem 41, controller 51 and interference regenerator 61. The interference eliminator 71 subtracts (eliminates) the regenerated signal $S_1$ from the signals $(S_0+S_1)$ transmitted from the radio 31, and transmits the obtained signal $S_0$ to the modem 41.

The modem 41 is connected to the radio 31, controller 51, interference eliminator 71 and network 81. The modem 41 demodulates the signal $S_0$ from the interference eliminator 71 and transmits the demodulated signal $S'_0$ to the network 81. The modem 41 also modulates a signal $S'_0$ from the network 81 and transmits the modulated signal $S_0$ to the radio 31.

The controller 51 is connected to the radio 31, modem 41, interference regenerator 61 and interference eliminator 71 to control these units.

The interfering radio base station 20 is connected to a network 80 to manage communications of the interfering radio terminal 10. Specifically, the interfering radio base station 20 has a radio 30, a modem 40 and a controller 50. The interfering radio base station 20 does not take into account the effect of interference due to a radio signal $S_0$ from the radio terminal 11.

The radio 30 is connected to the modem 40 and controller 50. The radio 30 transmits a signal $S_1$ from the modem 40 to the interfering radio terminal 10 via a radio channel, and transmits a radio signal $S_1$ transmitted via a radio channel from the interfering radio terminal 10 to the modem 40.

The modem 40 is connected to the radio 30, controller 50 and network 80. The modem 40 demodulates a signal $S_1$ from the radio 30 for transmission to the network 80, and modulates a signal from the network 80 for transmission to the radio 30. The controller 50 is connected to the radio 30 and modem 40 to control these units.

Operation of Conventional Interference Elimination System

In the interference elimination system of the above structure, the operation of eliminating the effect of interference due to a radio signal $S_1$ from another radio communication system (the interfering radio terminal 10) is performed through the steps shown in FIGS. 2 and 3.

At step 201, the radio 31 of the radio base station 21 receives radio signals $(S_0+S_1)$ from the radio terminal 11 affected by the interference (noise) due to the radio signal $S_1$ from the interfering radio terminal 10.

At step 202, the interference regenerator 61 demodulates the signals $(S_0+S_1)$ from the radio 31 in the same manner as in the interfering radio base station 20, to regenerate the radio signal $S_1$ from the interfering radio terminal 10.

At step 203, the interference eliminator 71 subtracts (eliminates) the regenerated signal $S_1$ from the signals $(S_0+S_1)$ transmitted from the radio 31, thereby extracting the radio signal $S_0$ from the radio terminal 11 with the interference (noise) due to the radio signal $S_1$ from the interfering radio terminal 10 eliminated. At step 204, the modem 41 demodulates the extracted signal $S_0$ and transmits the demodulated signal $S'_0$ to the network 81.

In the above interfering elimination system, the radio base station 21 must regenerate the radio signal $S_1$ from the interfering radio terminal 10, resulting in the complicated structure of the radio base station 21.

When it is necessary for the above interfering elimination system to take account of the effect of interference of radio signals from interfering radio terminals of a plurality of different radio communication systems, the radio base station 21 must regenerate the radio signals from the interfering radio terminals for each different radio communication system, resulting in a further complicated structure of the radio base station 21.

BRIEF SUMMARY OF THE INVENTION

The present invention has been made in view of the above problems, and thus has an object of providing an interference elimination system and an interference eliminating method in which an interfering radio base station as a radio base station of another radio communication system regenerates a radio signal transmitted from an interfering radio terminal, and an interfered radio base station eliminates interference using the regenerated radio signal.

According to a first aspect of the present invention, there is provided an interference elimination system for eliminating from a first radio signal transmitted from a first radio terminal to a first radio base station, the effect of interference due to a second radio signal transmitted from a second radio terminal to a second radio base station, the system comprising: an extractor in the second radio base station, the extractor extracting the second radio signal from radio signals received in the second radio base station; a transmitter in the second radio base station, the transmitter transmitting the extracted second radio signal to the first radio base station; and an interference eliminator in the first radio base station, the interference eliminator eliminating the second radio signal transmitted from the second radio base station, from radio signals received in the first radio base station.

Thus in the first aspect of this invention, the interference eliminator of the first radio base station eliminates the effect of interference due to the second radio signal from the first radio signal, using the second radio signal transmitted from the transmitter of the second radio base station, so that the first radio base station does not need to regenerate the second radio signal, having the less complicated structure.

Further, in the first aspect of this invention, even when it is necessary to take account of the effect of interference due to second radio signals from second radio terminals of a plurality of radio communication systems, the interference eliminator of the first radio base station eliminates the effect of interference of the second radio signals from the first radio signal, only using the second radio signals transmitted from the transmitters of the second radio base stations. This solves the problem of the complicated structure of the first radio base station.

According to a second aspect of the present invention, the extractor of the second radio base station preferably corrects a demodulated signal obtained through the demodulation of the received radio signals in a predetermined manner, using a correction signal including information on at least one of amplitude variation and phase variation of the received radio signals, thereby to extract the second radio signal.

Thus in the second aspect of this invention, the extractor of the second radio base station corrects the demodulated signal using the correction signal to extract the second radio signal. The extractor of the second radio base station thus precisely extracts the second radio signal even in an environment where amplitude variation or phase variation due to multipath fading occurs. The interference eliminator of the first radio base station can thus precisely eliminate from the first radio signal the effect of interference due to the second radio signal.

According to a third aspect of the present invention, the transmitter of the second radio base station preferably transmits a clock signal including synchronism information of the second radio signal together with the second radio signal; and the interference eliminator of the first radio base station preferably eliminates the second radio signal transmitted from the second radio base station, from the received radio signals, using the clock signal.

Thus in the third aspect of this invention, the interference eliminator of the first radio base station regularly eliminates from the first radio signal the effect of interference due to the second radio signal, in accordance with the clock signal synchronized with the second radio signal, resulting in more precise interference elimination.

According to a fourth aspect of the present invention, there is provided an interference eliminating method for eliminating from a first radio signal transmitted from a first radio terminal to a first radio base station, the effect of interference due to a second radio signal transmitted from a second radio terminal to a second radio base station, the method comprising the steps of: (A) extracting the second radio signal from radio signals received in the second radio base station; (B) transmitting the extracted second radio signal in the second radio base station to the first radio base station; and (C) eliminating the second radio signal transmitted from the second radio base station from radio signals received in the first radio base station.

Thus in the fourth aspect of this invention, at step (C), the effect of interference due to the second radio signal is eliminated from the first radio signal using the second radio signal transmitted at step (B). Thus the first radio base station does not need to regenerate the second radio signal, having the less complicated structure.

Further, in the fourth aspect of this invention, even when it is necessary to take account of the effect of interference of second radio signals from second radio terminals of a plurality of radio communication systems, the effect of interference due to the second radio signals are eliminated at step (C) from the first radio signal merely using the second radio signals transmitted at step (B). This solves the problem of a complicated structure of the first radio base station.

According to a fifth aspect of the present invention, at step (A), the second radio signal is preferably extracted through the correction of a demodulated signal obtained by the demodulation of the received signals in a predetermined manner, using a correction signal including information on at least one of amplitude variation and phase variation of the received radio signals.

Thus in the fifth aspect of this invention, at step (A), the demodulated signal is corrected with the correction signal to extract the second radio signal. Thus the second radio signal is precisely extracted at step (A) even in an environment where amplitude variation or phase variation due to multipath fading occurs. At step (C), the effect of interference due to the second radio signal can therefore be precisely eliminated from the first radio signal.

According to a sixth aspect of the present invention, at step (B), a clock signal including synchronism information of the second radio signal is preferably transmitted together with the second radio signal; and at step (C), the second radio signal transmitted from the second radio base station is preferably eliminated from the received radio signals, using the clock signal.

Thus in the sixth aspect of this invention, at step (C), the effect of interference due to the second radio signal is regularly eliminated from the first radio signal in accordance with the clock signal synchronized with the second radio signal, resulting in more precise interference elimination.

DETAILED DESCRIPTION OF THE INVENTION

STRUCTURE OF INTERFERENCE ELIMINATION SYSTEM

Figure 1:
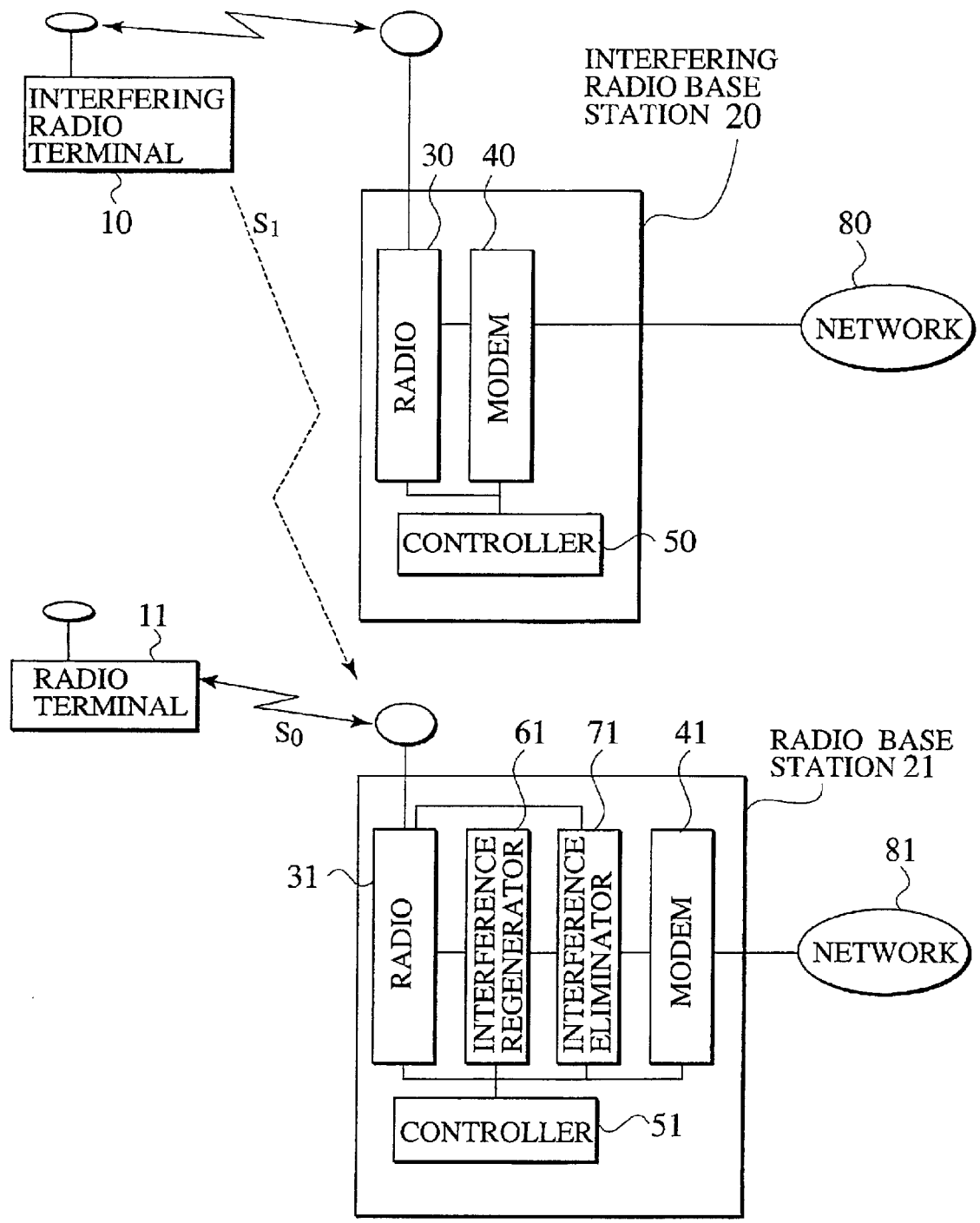
FIG. 1 is a schematic diagram of an interference elimination system according to a conventional art.
Figure 2:
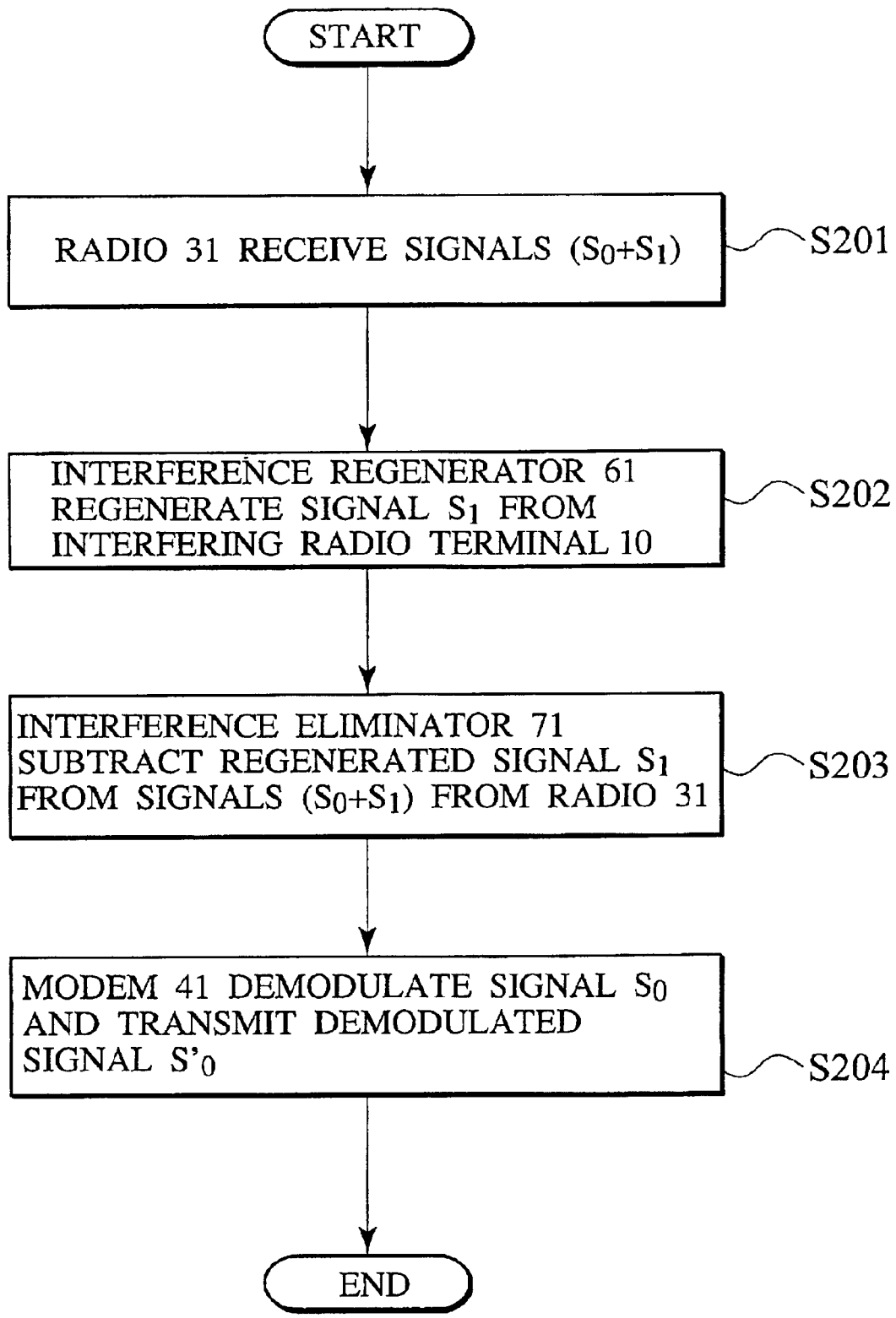
FIG. 2 is a flowchart illustrating the operation of the interference elimination system of the conventional art.
Figure 3:
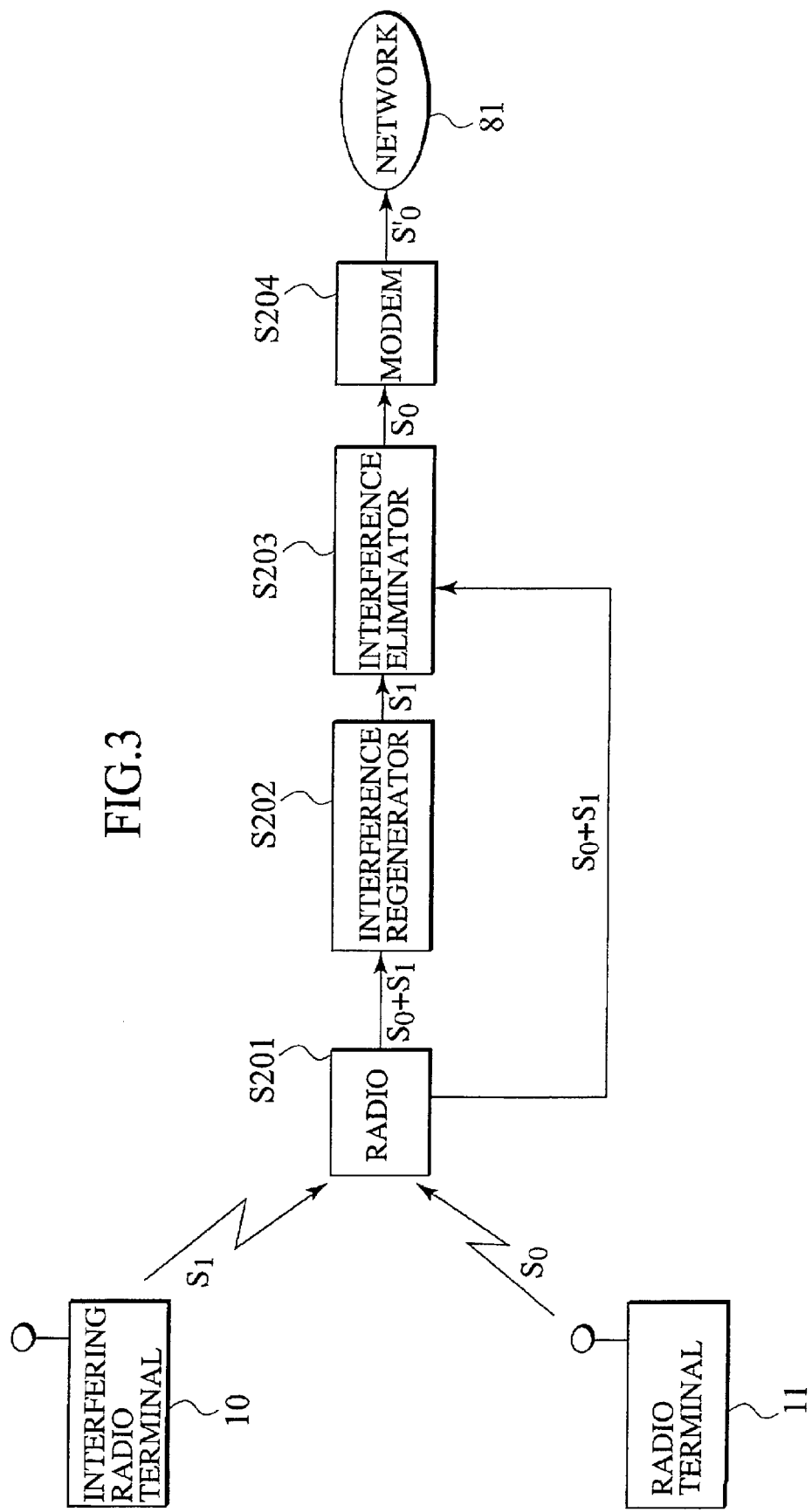
FIG. 3 is a diagram illustrating flows of signals in the interference elimination system of the conventional art.
Figure 4:
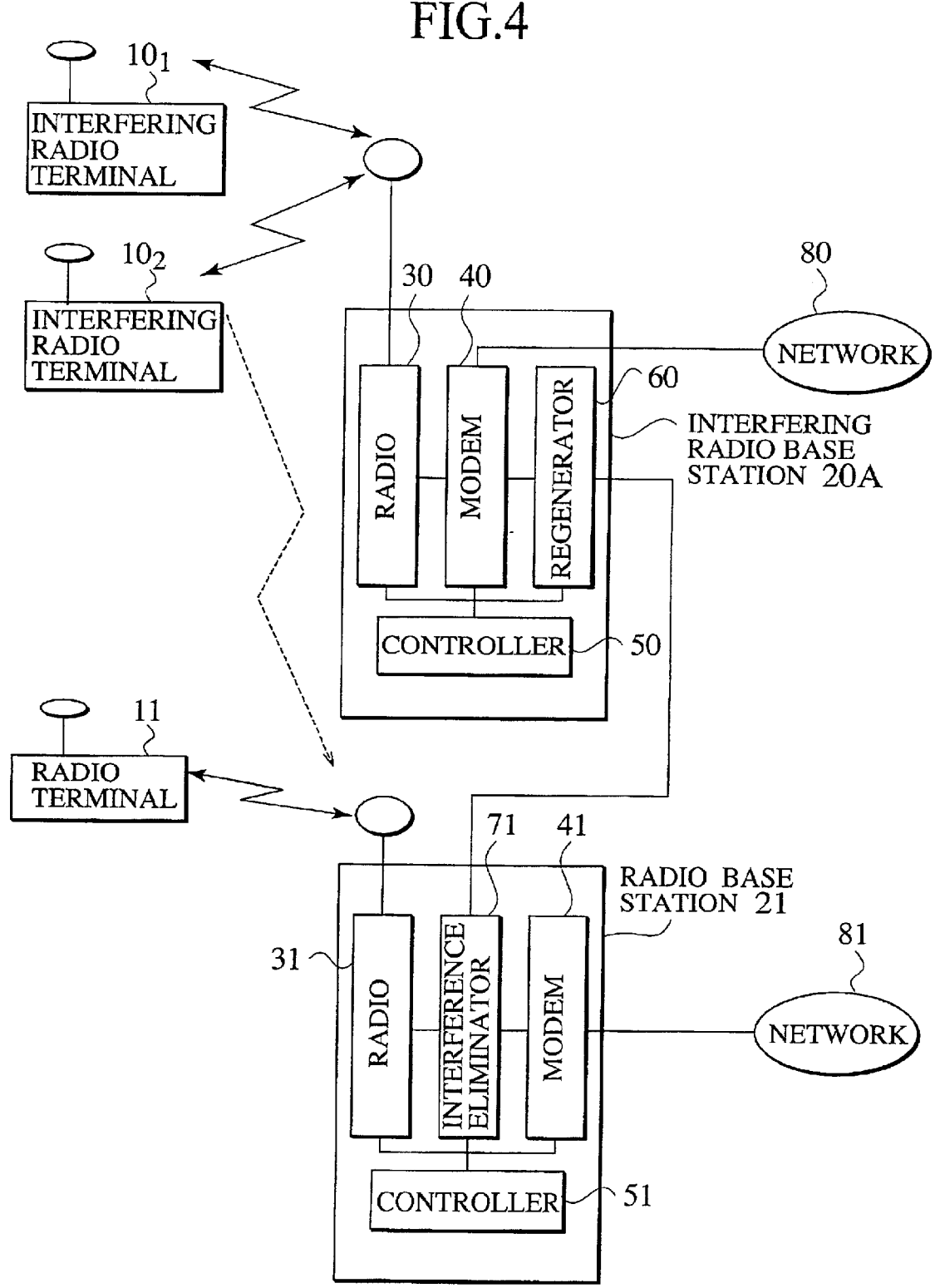
FIG. 4 is a schematic diagram of an interference elimination system according to an embodiment of the present invention.

With reference to FIG. 4, an embodiment of the present invention will be described.

An interference elimination system according to this embodiment has a radio base station 21 eliminating the effect of interference due to a radio signal $S_1$ transmitted from an interfering radio terminal 10 from received radio signals $(S_0+S_1)$ to extract the radio signal $S_0$ transmitted from a radio terminal 11.

More specifically, the interference elimination system of this embodiment includes interfering radio terminals $10_1$ and $10_2$, the radio terminal 11, the radio base station 21 and an interference regeneration radio base station 20A. The radio base station 21 and the interference regeneration radio base station 20A of different radio communication systems are located in the same place or adjoining places.

The radio terminal 11 is a radio communication device (first radio terminal) connected to the radio base station 21 via a radio channel. The interfering radio terminals $10_1$ and $10_2$ are radio communication devices (second radio terminals) connected to the interference regeneration radio base station 20A via radio channels.

The radio base station 21 is a first radio base station connected to a network 81 to manage communications of at least one radio terminal 11. Specifically, the radio base station 21 has a radio 31, a modem 41, a controller 51, and an interference eliminator 71. The network 81 is a radio communication network including a radio control station and a radio relay station.

The radio 31 is connected to the modem 41, controller 51 and interference eliminator 71. The radio 31 transmits a signal $S_0$ from the modem 41 to the radio terminal 11, and transmits radio signals $(S_0+S_1+S_2)$ transmitted from the radio terminal 11 and the interfering radio terminals $10_1$ and $10_2$ via radio channels to the interference eliminator 71.

The interference eliminator 71 is connected to the radio 31, modem 41, controller 51 and a regenerator 60 of the interference regeneration radio base station 20A. The interference eliminator 71 subtracts (eliminates) second radio signals, that is, regenerated signals $(S_1+S_2)$ transmitted from the interference regeneration radio base station 20A, from the radio signals $(S_0+S_1+S_2)$ received by the radio 31, and transmits the obtained signal $S_0$ to the modem 41. During the operation, the interference eliminator 71 synchronizes the signals $(S_0+S_1+S_2)$ from the radio 31 and the regenerated signals $(S_1+S_2)$ in accordance with a frame clock signal transmitted from the interference regeneration radio base station 20A.

The modem 41 is connected to the radio 31, controller 51, interference eliminator 71 and network 81. The modem 41 demodulates the signal $S_0$ from the interference eliminator 71 and transmits the demodulated signal $S'_0$ to the network 81. The modem 41 also modulates a signal $S'_0$ from the network 81 and transmits the modulated signal $S_0$ to the radio 31.

The controller 51 is connected to the radio 31, modem 41 and interference eliminator 71 to control these units.

The interference regeneration radio base station 20A is a second radio base station connected to the network 80 to manage communications of the interfering radio terminals $10_1$ and $10_2$. Specifically, the interference regeneration radio base station 20A has a radio 30, a modem 40, a controller 50, and the regenerator 60.

The radio 30 is connected to the modem 40 and controller 50. The radio 30 transmits signals $S_1$ and $S_2$ from the modem 40 to the interference radio terminals $10_1$ and $10_2$ via radio channels, and transmits radio signals $(S_0+S_1+S_2)$ transmitted from the radio terminal 11 and the interfering radio terminals $10_1$ and $10_2$ via radio channels to the modem 40.

The modem 40 is connected to the radio 30, controller 50, regenerator 60 and network 80. The modem 40 demodulates the radio signals $(S_0+S_1+S_2)$ received by the radio 30 and transmits the demodulated signals $(S'_1+S'_2)$ to the network 80 and the regenerator 60. The modem 40 modulates signals $S'_1$ and $S'_2$ from the network 80 and transmits the modulated signals $S_1$ and $S_2$ to the radio 30. The modem 40 generates channel estimation signals as correction signals including information on amplitude variation and phase variation due to multipath fading of the radio signals $(S_1+S_2)$ transmitted from the interfering radio terminals $10_1$ and $10_2$, and transmits the channel estimation signals to the regenerator 60.

The controller 50 is connected to the radio 30, modem 40 and regenerator 60 to control these units.

The regenerator 60 is connected to the modem 40 and controller 50, and the interference eliminator 71 of the radio base station 21. The regenerator 60 regenerates the radio signals $(S_1+S_2)$ transmitted from the interfering radio terminals $10_1$ and $10_2$ using the demodulated signals $(S'_1+S'_2)$ transmitted from the modem 40 and the channel estimation signals, and transmits the regenerated signals $(S_1+S_2)$ to the radio base station 21. The regeneration of the radio signals $(S_1+S_2)$ is performed by the modulation of the demodulated signals $(S'_1+S'_2)$ in the same manner as in the interfering radio terminals $10_1$ and $10_2$ and the correction of amplitude and phase variations based on the channel estimation signals. The regeneration of the radio signals $(S_1+S_2)$ may be done with the correction performed prior to the modulation.

The regenerator 60 may use part of the function of the modem 40. The modem 40 and the regenerator 60 constitute an extractor of the second radio base station. The regenerator 60 further constitutes a transmitter of the second radio base station.

When the interference regeneration radio base station 20A receives radio signals $S_1$ and $S_2$ from the interfering radio terminals $10_1$ and $10_2$, the regenerator 60 regenerates the radio signals $S_1$ and $S_2$ and transmits them together to the radio base station 21.

The regenerator 60 transmits a frame clock signal including synchronism information of the regenerated signals $(S_1+S_2)$ together with the regenerated signals $(S_1+S_2)$ to the radio base station 21 so that the interference eliminator 71 of the radio base station 21 can synchronize the signals $(S_0+S_1+S_2)$ received by the radio 31 and the regenerated signals $(S_1+S_2)$.

INTERFERENCE ELIMINATING METHOD USING INTERFERENCE ELIMINATION SYSTEM

Figure 5:
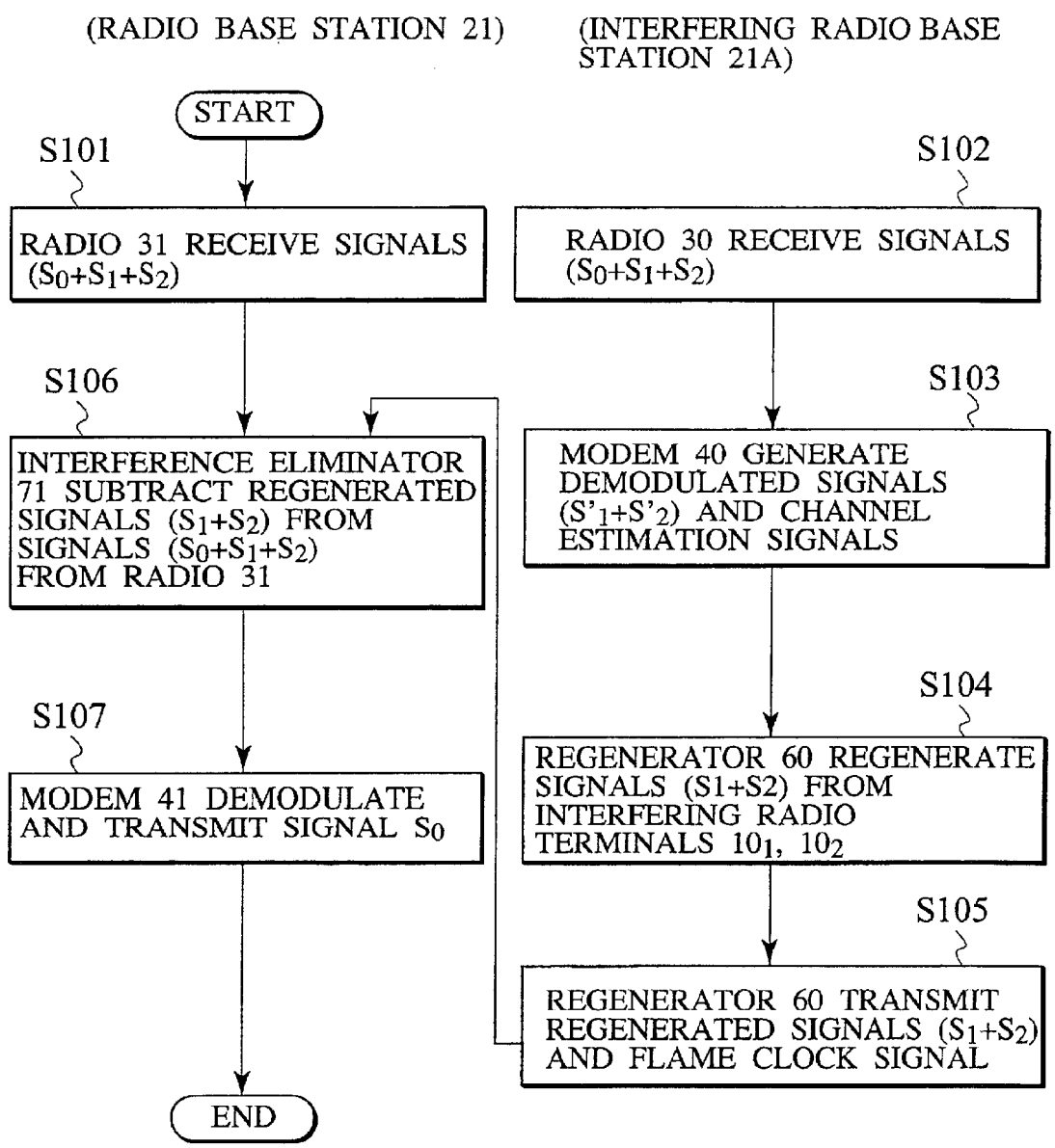
FIG. 5 is a flowchart illustrating the operation of the interference elimination system of the embodiment of this invention.
Figure 6:
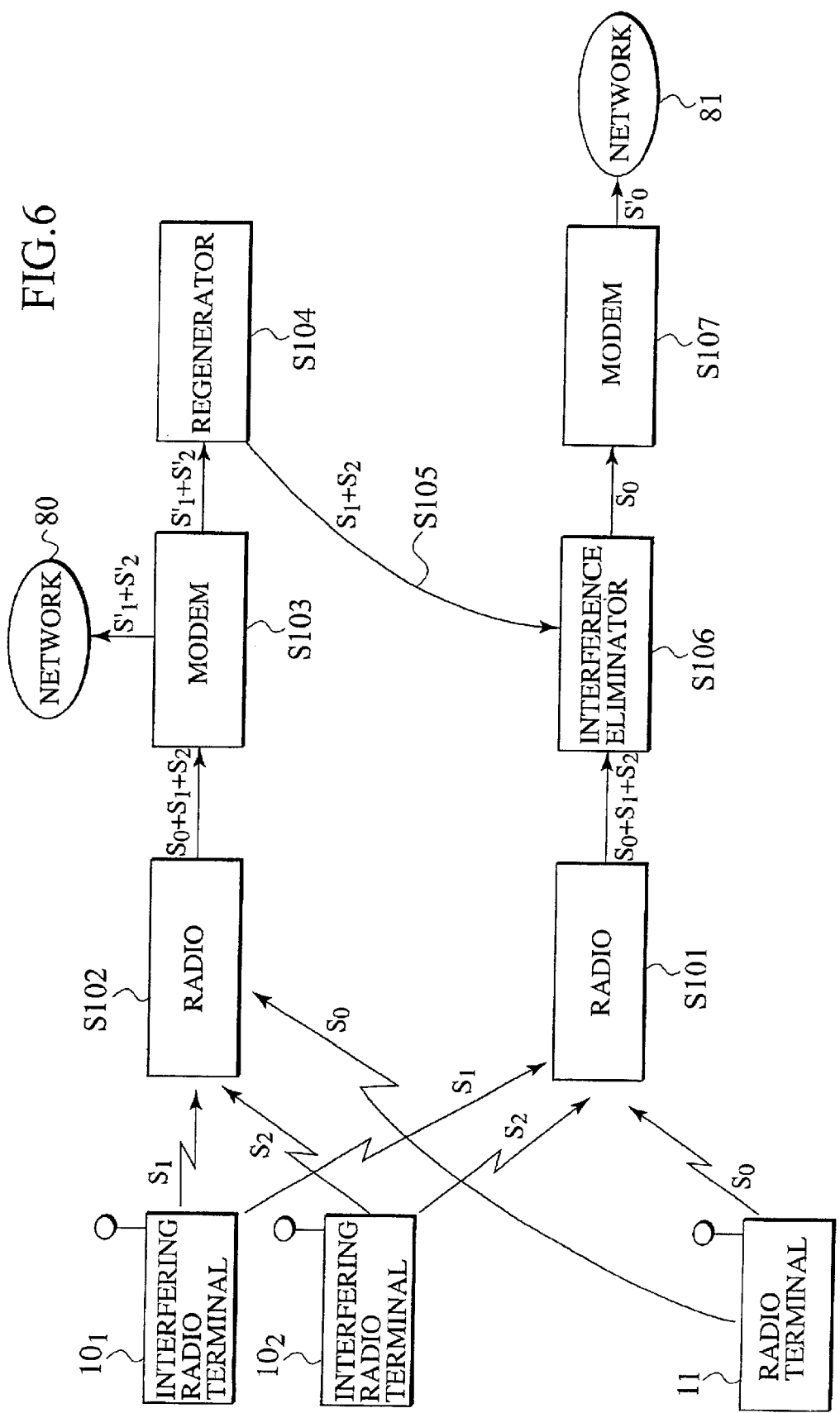
FIG. 6 is a diagram illustrating flows of signals in the interference elimination system of the embodiment of this invention.

An interference eliminating method using the interference elimination system of the above structure has the following steps. FIGS. 5 and 6 illustrate the operation of the above interference eliminating system for eliminating interference due to radio signals $(S_1+S_2)$ from another radio communication system (interfering radio terminals $10_1$ and $10_2$).

As shown in FIG. 5, at step 101, the radio 31 of the radio base station 21 receives radio signals $(S_0+S_1+S_2)$ from the radio terminal 11 affected by the interference (noise) due to the radio signals $(S_1+S_2)$ transmitted from the interfering radio terminals $10_1$ and $10_2$. The radio 31 transmits the radio signals $(S_0+S_1+S_2)$ to the interference eliminator 71.

At step 102, the radio 30 of the interference regeneration radio base station 20A receives the radio signals $(S_0+S_1+S_2)$ from the interfering radio terminals $10_1$ and $10_2$ affected by the interference (noise) due to the radio signal $S_0$ from the radio terminal 11. The radio 30 transmits the radio signals $(S_0+S_1+S_2)$ to the modem 40.

At step 103, the modem 40 generates the demodulated signals $(S'_1+S'_2)$ and channel estimation signals based on the radio signals $(S_0+S_1+S_2)$ from the radio 30. The modem 40 transmits the demodulated signals $(S'_1+S'_2)$ to the network 80 and the regenerator 60.

At step 104, the regenerator 60 modulates the demodulated signals $(S'_1+S'_2)$ in the same manner as in the interfering radio terminals $10_1$ and $10_2$, and corrects the modulated signals using the channel estimation signals, thereby generating the regenerated signals $(S_1+S_2)$.

At step 105, the regenerator 60 transmits the regenerated signals $(S_1+S_2)$ together with a frame clock signal to the interference eliminator 71 of the radio base station 21.

At step 106, the interference eliminator 71 subtracts (eliminates) the regenerated signals $(S_1+S_2)$ from the signals $(S_0+S_1+S_2)$ transmitted from the radio 31 to extract the radio signal $S_0$ from the radio terminal 11 with the interference (noise) due to the radio signals $S_1$ and $S_2$ from the interfering radio terminals $10_1+10_2$ eliminated.

At step 107, the modem 41 demodulates the extracted radio signal $S_0$ and transmits the demodulated signal $S'_0$ to the network 81.

FUNCTION AND EFFECT OF INTERFERENCE ELIMINATION SYSTEM AND INTERFERENCE ELIMINATING METHOD

According to the interference elimination system and the interference eliminating method according to the present embodiment, the interference eliminator 71 of the radio base station 21 eliminates the effect of interference due to the radio signals $(S_1+S_2)$ transmitted from the interfering radio terminals $10_1$ and $10_2$, from the radio signals $(S_0+S_1+S_2)$ received by the radio 31, using the radio signals $(S_1+S_2)$ transmitted from the regenerator 60 of the interference generation radio base station 20A. This eliminates the need for regenerating the radio signals $(S_1+S_2)$ in the radio base station 21, leading to the less complicated structure of the radio base station 21.

Further, according to the interference elimination system and the interference eliminating method according to the present invention, when it is necessary to take account of the effect of interference of radio signals transmitted from interfering radio terminals of a plurality of different radio communication systems, the interference eliminator 71 of the radio base station 21 can eliminate the effect of interference due to the radio signals transmitted from the interfering radio terminals, from radio signals received by the radio 31, merely using the radio signals transmitted from the regenerators of interference regeneration base stations. This solves the problem of a complicated structure of the radio base station 21.

Further, the regenerator 60 of the interference regeneration radio base station 20A corrects the modulated signals $(S'_1+S'_2)$ using the channel estimation signals. Thus the regenerator 60 of the interference regeneration radio base station 20A can precisely extract the radio signals $(S_1+S_2)$ transmitted from the interfering radio terminals $10_1$ and $10_2$ even in an environment where amplitude variation and phase variation due to multipath fading occur. The interference eliminator 71 of the base station 21 thus can precisely eliminate the effect of interference due to the radio signals $(S_1+S_2)$ transmitted from the interfering radio terminals $10_1$ and $10_2$, from the radio signals $(S_0+S_1+S_2)$ received by the radio 31.

Further, the interference eliminator 71 of the radio base station 21 regularly eliminates the effect of interference due to the radio signals $(S_1+S_2)$ transmitted from the interfering radio terminals $10_1$ and $10_2$, from the radio signals $(S_0+S_1+S_2)$ received by the radio 31, in accordance with the frame clock signal synchronized with the radio signals $(S_1+S_2)$ regenerated by the regenerator 60 of the interference regeneration radio base station 20A. This enables more precise elimination of interference.

As described above, the present invention provides the interference elimination system and the interference eliminating method in which the regenerator 60 of the interference regeneration radio base station 20A as a radio base station of another different radio communication system regenerates the radio signals $(S_1+S_2)$ transmitted from the interfering radio terminals $10_1$ and $10_2$, and the interference eliminator 71 of the radio base station 21 uses the regenerated radio signals $(S_1+S_2)$ to eliminate the effect of interference due to the radio signals $(S_1+S_2)$ transmitted from the interfering radio terminals $10_1$ and $10_2$, from the radio signals $(S_0+S_1+S_2)$ received by the radio 31.

Although the present invention has been described in detail with reference to a certain embodiment thereof, it is clearly understood by a person skilled in the art that the present invention should not be limited to the embodiment described in the present application. The system and method of the present invention may be implemented through modifications or variations without departing from the spirit and scope of the present invention defined by the appended claims. Thus the description of the present application is only for illustrative purposes and imposes no limitation on the present invention.

What is claimed is:

1. An interference elimination system for eliminating from a first radio signal transmitted from a first radio terminal to a first radio base station, the effect of interference due to a second radio signal transmitted from a second radio terminal to a second radio base station, said system comprising:

an extractor in said second radio base station, said extractor extracting said second radio signal from radio signals received in said second radio base station;

a transmitter in said second radio base station, said transmitter transmitting said extracted second radio signal to said first radio base station; and an interference eliminator in said first radio base station, said interference eliminator eliminating said second radio signal transmitted from said second radio base station, from radio signals received in said first radio base station.

2. An interference elimination system as set forth in claim 1, wherein said extractor of said second radio base station corrects a demodulated signal obtained through the demodulation of said received radio signals in a predetermined manner, using a correction signal including information on at least one of amplitude variation and phase variation of the received radio signals, thereby to extract said second radio signal.

3. An interference elimination system as set forth in claim 1, wherein:

said transmitter of said second radio base station transmits a clock signal including synchronism information of said second radio signal together with said second radio signal; and said interference eliminator of said first radio base station eliminates said second radio signal transmitted from said second radio base station, from said received radio signals, using said clock signal.

4. An interference elimination system as set forth in claim 2, wherein:

said transmitter of said second radio base station transmits a clock signal including synchronism information of said second radio signal together with said second radio signal; and said interference eliminator of said first radio base station eliminates said second radio signal transmitted from said second radio base station, from said received radio signals, using said clock signal.

5. An interference eliminating method for eliminating from a first radio signal transmitted from a first radio terminal to a first radio base station, the effect of interference due to a second radio signal transmitted from a second radio terminal to a second radio base station, said method comprising the steps of:

(A) extracting said second radio signal from radio signals received in said second radio base station;

(B) transmitting said extracted second radio signal in said second radio base station to said first radio base station; and (C) eliminating said second radio signal transmitted from said second radio base station from radio signals received in said first radio base station.

6. An interference eliminating method as set forth in claim 5, wherein, at step (A), said second radio signal is extracted through the correction of a demodulated signal obtained by the demodulation of said received signals in a predetermined manner, using a correction signal including information on at least one of amplitude variation and phase variation of said received radio signals.

7. An interference eliminating method as set forth in claim 5, wherein:

at step (B), a clock signal including synchronism information of said second radio signal is transmitted together with said second radio signal; and at step (C), said second radio signal transmitted from said second radio base station is eliminated from said received radio signals, using said clock signal.

8. An interference eliminating method as set forth in claim 6, wherein:

at step (B), a clock signal including synchronism information of said second radio signal is transmitted together with said second radio signal; and at step (C), said second radio signal transmitted from said second radio base station is eliminated from said received radio signals, using said clock signal.

* * * * *